US009792339B2

(12) United States Patent
Jayapal et al.

(10) Patent No.: US 9,792,339 B2
(45) Date of Patent: Oct. 17, 2017

(54) AUTOMATIC CONTENT REPLICATION

(71) Applicant: Microsoft Corporation, Redmond, WA (US)

(72) Inventors: Prasanna K. Jayapal, Bothell, WA (US); David C. James, Snohomish, WA (US); Leyu Feng, Redmond, WA (US); Bippen Bisht, Redmond, WA (US); Brandon M. Waterloo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 14/158,763

(22) Filed: Jan. 17, 2014

(65) Prior Publication Data

US 2015/0205849 A1    Jul. 23, 2015

(51) Int. Cl.
*G06F 17/30* (2006.01)

(52) U.S. Cl.
CPC .............................. *G06F 17/30575* (2013.01)

(58) Field of Classification Search
CPC ......... G06F 17/30575; G06F 17/30578; G06F 17/30581
USPC ....... 707/610, 634, 635, 636, 637, 638, 639, 707/626
See application file for complete search history.

(56) References Cited

U.S. PATENT DOCUMENTS

| | | | |
|---|---|---|---|
| 8,185,501 B1 * | 5/2012 | Cherukumudi ... | G06F 17/30563 707/610 |
| 8,290,899 B2 * | 10/2012 | Webman ............ | G06F 11/2097 707/610 |
| 8,527,639 B1 | 9/2013 | Liskov et al. | |
| 9,118,695 B1 * | 8/2015 | Korhonen ........... | H04L 67/1097 |
| 2002/0194015 A1 * | 12/2002 | Gordon ................. | G06Q 10/10 705/1.1 |
| 2004/0153473 A1 * | 8/2004 | Hutchinson ....... | G06F 17/30575 |
| 2005/0262246 A1 * | 11/2005 | Menon ............. | H04N 21/23103 709/226 |
| 2009/0125569 A1 | 5/2009 | Achtermann et al. | |

(Continued)

OTHER PUBLICATIONS

Agarwal, et al., "Volley: Automated Data Placement for Geo-Distributed Cloud Services", In Proceedings of 7th USENIX Symposium on Networked Systems Design and Implementation, Apr. 28, 2010, 16 Pages.

(Continued)

*Primary Examiner* — Greta Robinson
(74) *Attorney, Agent, or Firm* — David W. Grillo

(57) ABSTRACT

Content can be replicated automatically to facilitate distribution of the content to one or more devices. Determinations can be made automatically regarding where to replicate data, how to replicate data, and when to replicate data based on a variety of collected data with respect to devices, content servers, content sources, and content. More particularly, one or more content servers can be identified as targets for content replication and a protocol can be determined to replicate content from at least one source to the one or more content servers identified. Subsequently, replication can be initiated to the one or more content servers with the corresponding protocol at a determined time. Further, similar mechanisms can be employed to enable automatic determination of how and when to distribute or replicate content from one or more content servers to one or more target devices.

18 Claims, 13 Drawing Sheets

(56) References Cited

U.S. PATENT DOCUMENTS

| | | | |
|---|---|---|---|
| 2010/0107205 A1* | 4/2010 | Foti | H04L 65/4084 |
| | | | 725/109 |
| 2013/0054526 A1* | 2/2013 | Di Vincenzo | G06F 17/30575 |
| | | | 707/634 |
| 2013/0246588 A1 | 9/2013 | Borowicz et al. | |
| 2014/0164328 A1* | 6/2014 | Calo | G06F 17/30575 |
| | | | 707/626 |
| 2014/0229442 A1* | 8/2014 | Wankawala | G06F 3/065 |
| | | | 707/639 |

OTHER PUBLICATIONS

Aioffi, et al., "Dynamic Content Placement for Mobile Content Distribution Networks", In Proceedings of 9th International Workshop on Web Content Caching and Distribution, Oct. 18, 2004, 19 Pages.

Afonso, et al., "Dynamic Data Delivery to Mobile Users", In Proceedings of IEEE Tenth International Workshop on Database and Expert Systems Applications, Sep. 3, 1999, 6 Pages.

Podnar, et al., "Mobile Push: Delivering Content to Mobile Users", In Proceedings of 22nd International Conference on Distributed Computing Systems Workshops, Jul. 2, 2002, 6 Pages.

Tariq, et al., "Mobility Aware Server Selection for Mobile Streaming Multimedia Content Distribution Networks", In Proceedings of 8th International Workshop on Web Content Caching and Distribution, Dec. 5, 2004, 12 Pages.

* cited by examiner

AUTOMATIC CONTENT REPLICATION

BACKGROUND

A content distribution system comprises a collection of network-connected content servers arranged to facilitate delivery of content to end-users by way of end-user devices. Central to content distribution is content replication, which pertains to duplicating content across multiple content servers. Content can then be delivered to end-user devices in a reliable and timely manner from the content servers.

Content distribution systems are typically managed by information technology (IT) administrators. Conventionally, an IT administrator selects at least one content server and pushes the content to the at least one content server. Subsequently, the IT administrator initiates download of the content by target devices from the one or more content servers.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to automatic content replication. Determinations can be made automatically with respect to where, how, and when to replicate content to enable efficient distribution of content to a set of target devices. The determinations can be based on a variety of factors associated with content servers, target devices, content sources, and content. Based on acquired data, one or more content servers can be targeted for replicate content, a protocol can be determined for use with respect to replicating content to the one or more content servers, and a time determined for initiating replication. Subsequently, content can be replicated to the one or more content servers targeted with the protocol at the determined time. In accordance with one aspect, a variety of weights capturing replication relevant data can be computed and assigned to content servers and distances related to content servers calculated to facilitate determinations regarding where, how, and when to replicate data. Similar mechanisms can also be employed automatically to determine at least how and when to replicate content from one or more content servers to one or more target devices.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Conventionally, content distribution systems employ two manual processing steps. First, an information technology (IT) administrator pushes content to a content server. Second, the IT administrator initiates download of the content from the content server by devices. In addition, planning and staging is difficult, especially in large-scale enterprise systems and in cases where devices roam across locations, resulting in inefficiencies.

Details below generally pertain to automatic content replication. Determinations are made automatically regarding where to replicate data, how to replicate data, and when to replicate data in order to provision content efficiently to a target set of devices. More specifically, one or more content servers can be targeted as staging locations for replicated content based on a variety of data collected with respect to devices, content servers, content sources, content priority, and the rules defined by the IT administrator. One or more protocols can be determined with respect to provisioning content to the one or more content servers, for example, based on the number of target content servers, location, and the quality of communication links between a content source and content servers. Further, a determination is made as to when to initiate content replication based on factors such as the priority of the content, deadline, past performance, and the protocol chosen. Additionally, similar mechanisms can be employed to automatically determine how and when to distribute or replicate content from one or more content servers to one or more target devices. As a result, IT administrators can merely identify content and target devices and are relieved of extensive planning, which is typically inadequate or inaccurate, as well as manual processing steps. Moreover, such automatic replication can be configured to enable target devices to acquire content as quickly and efficiently as possible.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
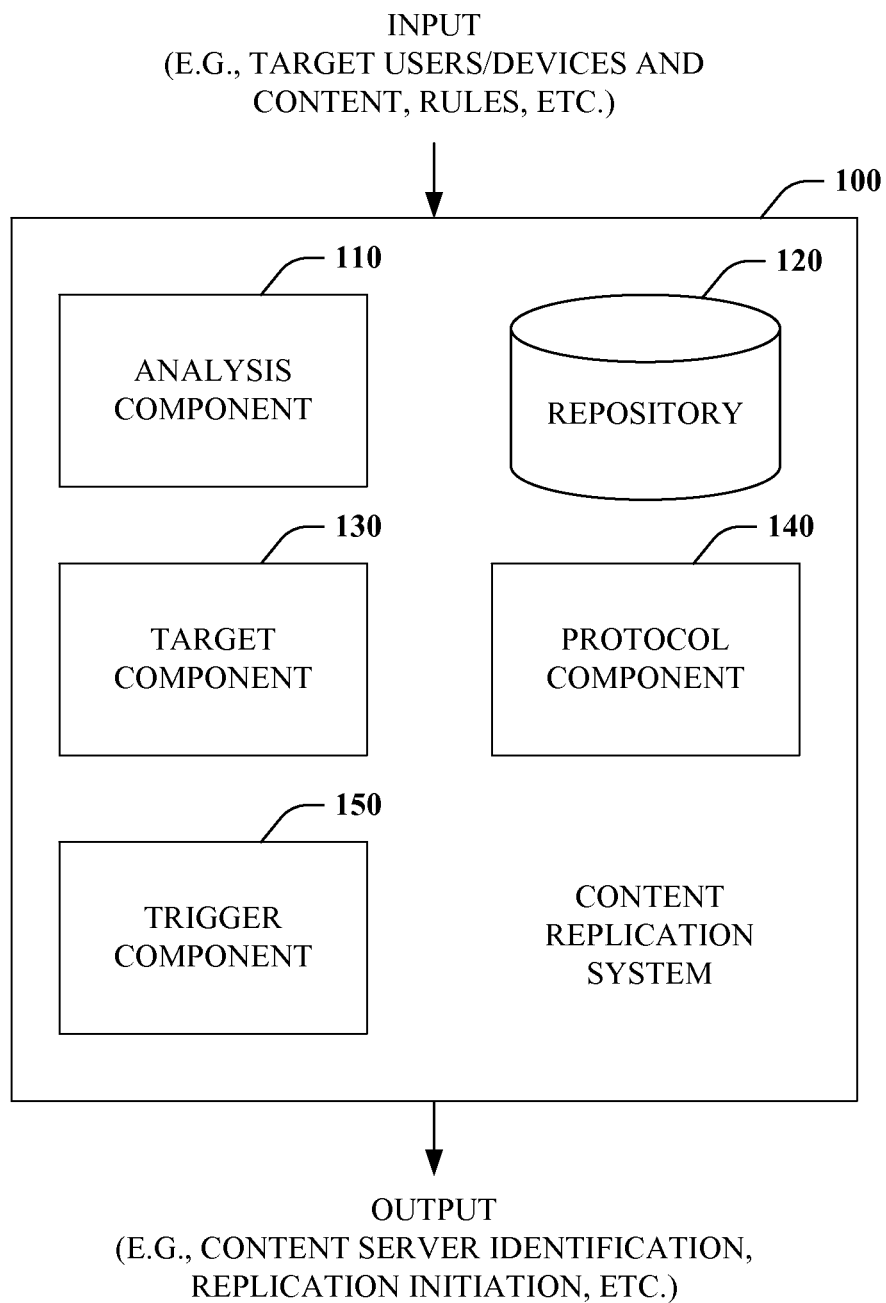
FIG. 1 is a block diagram of a content replication system.

Referring initially to FIG. 1, a content replication system 100 is illustrated. The content replication system 100 is configured to automatically replicate data to one or more target devices quickly and efficiently. Herein, content refers more specifically to electronic content comprising data that can be disseminated across a network, such as the Internet, electronically. For example, content can comprise, among other things, software, and digital media including images, audio, and video. A content server is configured to store content and serve, replicate, or otherwise make data available to devices, which are computer devices, or simply computers, including desktops, laptops, tablets, and mobile devices (e.g., smart phones), among other things. A content server can also be said to act as a temporary stage for content prior to distribution to devices, and thus, to stage content means to save the content for later distribution. A content server can also be referred to as a distribution point, edge node, or staging server. Further, a content server can be an on-premises server, a cloud storage location, a server located in a datacenter, a personal computer, or other variations.

The content replication system 100 includes analysis component 110, repository 120, target component 130, protocol component 140, and trigger component 150. In brief, the analysis component 110 is configured to analyze the infrastructure and resources of a content distribution system, and store results in the repository 120, for use in automatically determining where, how, and when to replicate content. The target component 130 is configured to identify one or more content servers to target for replicate data to enable the data to subsequently be provided to one or more target devices. The protocol component 140 is configured to determine a protocol to utilize in conjunction with replicating content to one or more identified content servers, and the trigger component 150 is configured to initiate replication of content to the one or more identified servers with one or more corresponding protocols at a determined time. The protocol component 140 and trigger component 150 can also be utilized in a similar manner to determine how and when to serve content to target devices. Each component will now be described in further detail.

The analysis component 110 is configured to acquire information regarding devices, content servers, content sources, and content, among other things. For instance, the analysis component 110 can keep track of all devices in an organization and information about and concerning devices including but not limited to IP (Internet Protocol) address and network boundaries, subnets, or active directory sites to which devices belong. These data points contribute to deciding which boundary group a device belongs to if not otherwise known, wherein a boundary group is a virtual demarcation that aids grouping devices and content servers that are in close proximity. The analysis component 110 can also acquire information about all available content servers such as their locations, configuration (e.g., processor, memory, software . . . ), network configurations, boundary details, bandwidth throttling constraints, and sites to which they are assigned. Location and configuration of a content source can also be determined by the analysis component 110. Further, content itself can be analyzed to determine content size, execution environment (e.g., −86), and priority, among other things. After acquisition, the data or information can be saved to the repository 120 in a manner accessible for use by other components.

Figure 2:
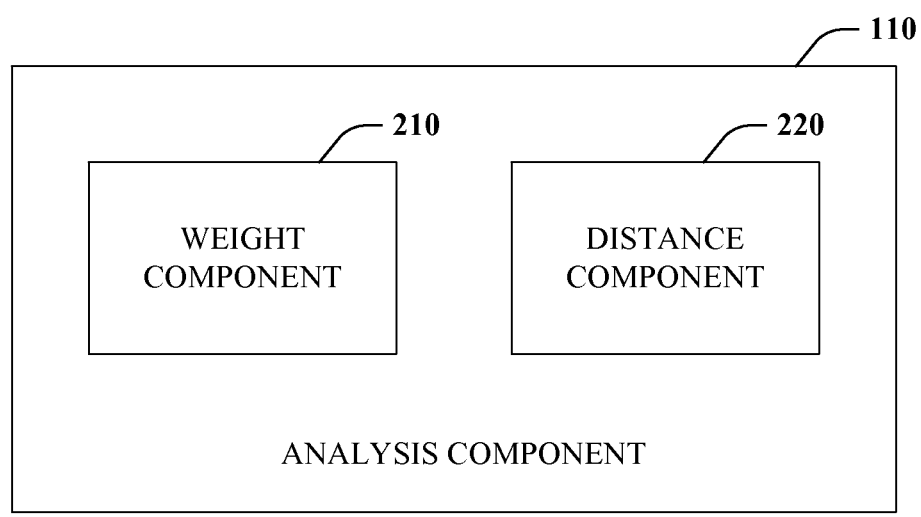
FIG. 2 is a block diagram of a representative analysis component.

Turning attention to FIG. 2, a representative analysis component 110 is depicted in further detail. In addition to identifying and recording information, the analysis component can process data to produce useful results. As shown, the analysis component 110 includes weight component 210 and distance component 220. The weight component 210 is configured to compute, calculate, or otherwise determine a weight from other information. In accordance with one embodiment, the weight component 210 can compute weights for content servers that capture various aspects of content servers. The distance component 220 is configured to compute, calculate, or otherwise determine distances between various elements of a content distribution system, which allow determinations regarding proximity.

Figure 3:
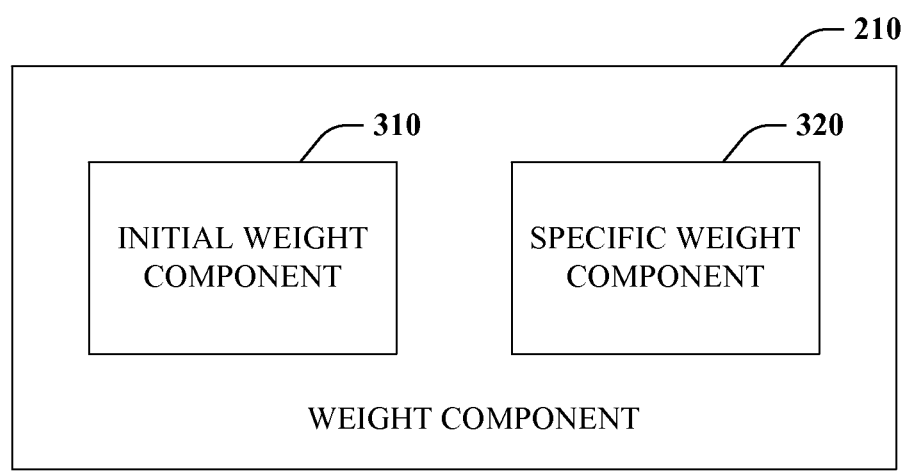
FIG. 3 is a block diagram of a representative weight component.

FIG. 3 illustrates representative weight component 210 in further detail. The weight component 210 includes initial weight component 310 and specific weight component 320. The initial weight component 310 is configured to compute an initial weight without regard to specifics, for instance regarding content and targeted devices. For example, the initial weight component 310 can compute a value representative of efficiency and performance with respect to storing content as well as provisioning data to devices. In this case, a content server configuration including processor, memory, and storage, for instance can be utilized to produce the weight. Furthermore, the type of the content server such as on premise, in the cloud, or at a third-party location can be considered.

The specific weight component 320 generates weights for content servers specific to content and targeted devices. In accordance with one embodiment, a specific weight can be generated based on, or as a function of, an initial weight. Further, a specific weight can result from updating or otherwise modifying an initial weight to reflect specifics. For example, content servers that include space to store the content can be weighted more favorably that those that cannot support the size of the content. Additionally, content servers that reach more devices that provide an execution environment used by the content can be weighted more favorably than those that include smaller numbers of such devices. Further, the content server weights can be adjusted to reflect a number of target devices reachable by a content server such that those content servers that reach more target devices than others are weighted more favorably. Further, weights can be adjusted as a function of device roaming For instance, where based on historical or other information it can be determined or inferred that a specific target devices roams across different locations, content servers that can reach such a device or are within the roaming pattern can be weighted more favorably than those outside the roaming pattern. Specific weights can also reflect additional or custom criteria specified by an administrator to reflect administrator knowledge or preferences, or customer limitations, for example. For example, if for some reason one content server is preferred over another that server can be weighted to reflect the preference.

Specific weights can also be computed based on content priority. At any given time there could be different content flowing through a system. High priority content can be given preference over low priority content. In other words, content priority is similar to a weight for content. Priority can be automatically computed or an administrator can define priority of content. By way of example, security patches are usually defined as high priority content. Integration of priority with specific weights enables production of weights at least specific to content and content server pairs.

Figure 4:
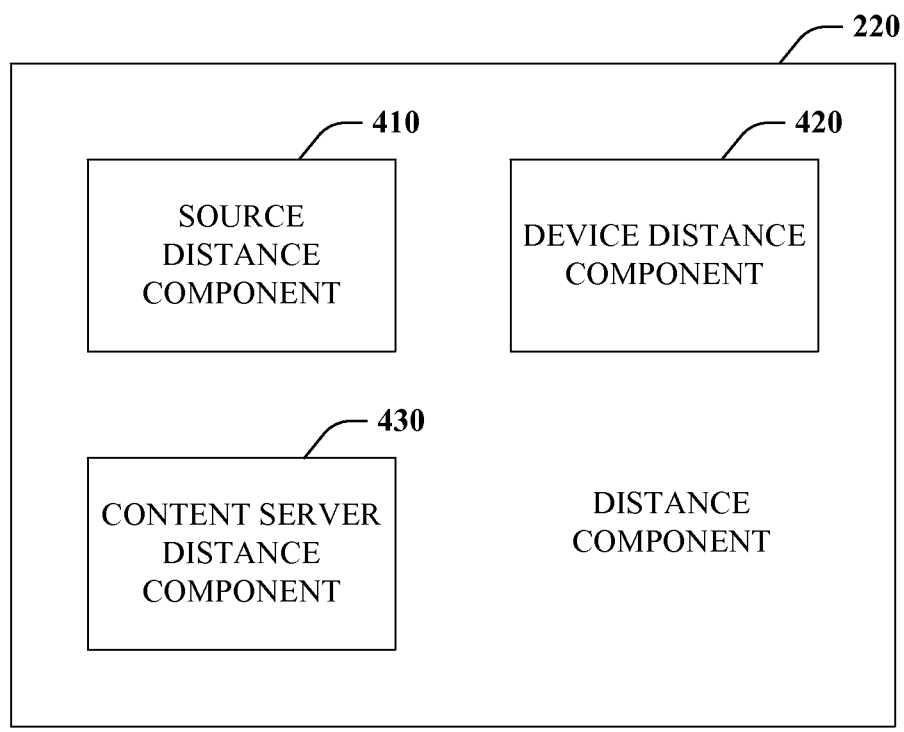
FIG. 4 is a block diagram of a representative distance component.

FIG. 4 shows a representative distance component 220 in further detail. Again, the distance component 220 is configured to compute, calculate, or otherwise determine distances. Distance includes but is not limited physical distance, number of network hops between a source and a destination, and latency. As depicted, the distance component 220 includes source distance component 410, device distance component 420, and content server distance component. The source distance component 410 is configured to determine the distance from source content to one or more content servers. In other words, distance of source content to a potential staging location for a replica on a content server is computed, calculated, or otherwise determined. The distance between a source and content server can be significant in selecting a content server for data replication, since it is likely that it is faster and more efficient to replicate data from a source to a content server that is closer to the source rather than farther from the source. The device distance component 420 is configured to determine the distance between a content server and one or more devices that are able to acquire content from the server. Here, the distance of a target devices to a content server may be noteworthy in selecting a content server, as it may be more efficient to target a content server that is closer to target devices rather than farther away from target devices. The content server distance component 430 is configured to determine the distance between content servers. Content servers can also function as a source for other content servers. Accordingly, the distance between content servers can be significant in determining whether to replicate content from one content server to another content server. Here, it may be more efficient to replicate content between content servers that are closer in distance as opposed to farther away.

With respect to the analysis component 110, note that device association can optionally be employed as an indirect way to compute weights as well as content paths. For example, content is targeted to users, and users can have multiple devices. Accordingly, a content path can be calculated from a source to multiple user devices. However, a higher weight can be given to devices that are frequently used by a user. Stated differently, higher preference is given to user's primary device (e.g., most frequently used) over less frequently used devices.

Returning to FIG. 1, the repository 120 is a place where data can be stored and maintained. By way of example, the repository can correspond to a one or more files or databases. Moreover, the repository 120 and store a plurality of data or information associated with content distribution and more particularly content replication. For instance, the repository can store data collected and generated by the analysis component 110 and make this data available for use by other components. As another non-limiting example, the repository 120 can store additional or custom rules, criteria, or limitations input by an IT administrator or other person. Furthermore, in one instance the repository can be local to other components as shown. However, the repository can also be located remote to other components but accessible by the components.

The target component 130 is configured to identify one or more content servers as targets for replicated content based on a variety of factors. Furthermore, selection of content servers can be performed automatically without human interaction. Some factors considered by the target component 130 include content server configuration (e.g., hardware, software), location, distance relative to a content server, content, target devices, and device-roaming pattern. As a simple example, if a number of target devices are located in a branch office and there is a content server in the branch office, the content server can be identified as a target for replicate data to enable content to be provided to the devices in the branch office. Furthermore, the target component 130 can be configured to minimize network traffic, network bandwidth consumption, or distance (e.g., physical, network hops, latency), as much possible in selecting one or more content servers to enable content to be distributed to target devices quickly and efficiently.

In accordance with one implementation, weights can be assigned to content servers that capture various factors related to efficiently identifying content servers. In this scenario, the target component 130 can utilize previously calculated weights (e.g., by analysis component 110), initiate weight computation, or determine weights itself and utilize the weights to identify target content servers. By way of example, and not limitation, given content and a set of target devices, the target component 130 can employ initial or standard weights capturing content server configuration (e.g., storage space, availability, I/O efficiency), network bandwidth, and number of devices served, for example to identify an initial list of one or more content servers. Subsequently, specific weights associated with the content and target devices can be employed to narrow the list. For example, content servers can be weighted based on ability to store the content (e.g., available storage space) and the number of target devices that can be served by the content server.

As an example, consider a case where there are a set of devices "D" in a boundary group (e.g., a virtual demarcation that aids identifying devices and content servers in close proximity) "B" for which content "C" is targeted. The target component 130 can seek locate a content server "S" in the same boundary group as the set of devices "D" to minimize the distance between a content server and target devices. If there are multiple content servers in the boundary group, the best suitable content server for this scenario can be identified for example based on availability storage space, efficiency, network traffic, and load on the server, among other things. If no content servers are present in a boundary group comprising devices, the target component can locate the nearest remote content server that can efficiently serve devices in the boundary group.

The protocol component 140 is configured to determine a protocol to replicate content to identified content targets automatically. One aspect of determining the protocol comprises selecting one or more of pull, push, or broadcast protocols to employ. The push protocol pertains to pushing content from a source to a destination. In accordance with one aspect, content stored at one location (e.g., original/master content source) and be pushed to a set of content servers that are centrally located and can be accessed by various content servers and devices from different boundary groups. The pull protocol concerns pulling content from a source by a destination. In one instance, a specific instruction can be sent to content servers with details indicating where to pull the content. Further, primary and secondary locations for content can be provided such that if content servers cannot pull content from the primary location the secondary can be employed as a fallback. Broadcast protocol establishes a session which content servers can participate to acquire the content. Similar to the pull protocol, content servers can be notified with specific instructions that identify who will initiate a session and any fallback sessions.

The protocol determination can be based on a number of factors. One factor is which protocols are supported by content targets. If a content server supports a single protocol such as push, that is the protocol selected. If a content server supports more than one protocol, other factors can be considered including the number of content servers, location, and the quality of communication links (e.g., reliability, bandwidth, speed . . . ) between a content source and one or more content servers. For example, if there is a single content server that is to be provided content the content can be pushed to the content server. As another example, if there are multiple content servers in substantially the same location close to a source, broadcast can be selected. In yet another example, if there are multiple content servers in substantially the same location with a slow or unreliable communication link, the pull protocol can be selected to allow the content servers to acquire the content from the source.

The protocol component 140 can also handle arbitrarily complex scenarios. For instance, the source location can be determined based on a variety of factors including network bandwidth, speed, and traffic. Furthermore, content servers can be targets for replicated content and subsequently content sources. Still further, a combination of protocols can be employed for identified content servers. By way of example and not limitation, content can be pushed from an original content source to a few content servers and for the remaining content servers identified to stage content, a notification can be sent notifying them to either pull content down from other content servers or participate in a broadcast session to acquire the content.

The trigger component 150 is configured to initiate content replication to one or more content servers identified by the target component 130 by way of one or more protocols determined by the protocol component 140. Moreover, the trigger component 150 is configured to determine when to initiate content replication based on several factors including a deadline, past performance, and a roaming pattern of one or more devices among other things. When a content replication is initiated can also be a function of whether the content is mandatory or optional for devices. Where the content is mandatory that means all target devices need to receive the content and often there can be a deadline associated with content delivery. In this case, path from a content source to a content server and from the content server to the device can be considered in making the determination of when to initiate replication to comply with the deadline. Further, past performance can be considered as well as roaming patterns since it may take additional time for a device outside a network or roams to different locations. In an optional scenario, simply needs to be provided to the content server. Accordingly, the path or distance between the content source and one or more content servers can be considered in the determination. In accordance with one implementation, weights that capture pertinent information related to content replication can be determined and assigned to facilitate determining when to initiate replication.

Initiating content replication can vary based on protocol or in other words how content is to be replicated. For example, in the context of pull protocol, target devices can be notified that content is available with details regarding where the content is located. As per, push the content can be pushed after first notifying the device that content is incoming or without notification. With respect to broadcast, devices can be notified that a session is being established by a particular entity with an invitation to join the session to acquire content. Furthermore, a replication order may be established. Consequently, initiation of content replication may be performed in multiple phases or steps to implement the order.

The target component 130, the protocol component 140, and the trigger component 150 can be configured to support customization. For example, additional rules, constraints, or limitations can be specified, for example by an IT administrator, that affect which content servers are targeted. Similarly, existing rules or the like can be customized, which likewise affect which content servers are selected. As another example, a content path for content can be overridden, and one could specify what protocol a system should use to distribute the content. As yet another example, a determined time to initiate replication can be overridden and substituted with a specified time. Support for customization enables IT administrators to inject their knowledge into the automatic system as well as requirements of software customers.

Although described extensively with respect to replicating data with respect to content servers, it is be appreciated that similar mechanisms can be utilized with respect to automatically determining at least how and when content is to be provided or replicated from a content server to a target device. In particular, a two-stage process can be performed, wherein first, a determination is made regarding replication of data to content servers and second, a determination is made with respect to replication of data from content servers to target devices. However, the determinations need not be independent from one another, but rather in one embodiment, determinations can be made in conjunction with each other.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the content replication system 100 and various components thereof may include such mechanisms to facilitate efficient and adaptive replication. For instance, the content replication system 100 can be implemented as a rules engine that takes environmental and other variables into account and selects a content replication configuration (e.g., where, how, when) from a plurality of available configurations that is most efficient, expeditious, or other desired characteristic.

In view of the exemplary systems described above, methodologies that may be implemented in accordance with the disclosed subject matter will be better appreciated with reference to the flow charts of FIGS. 5-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 5:
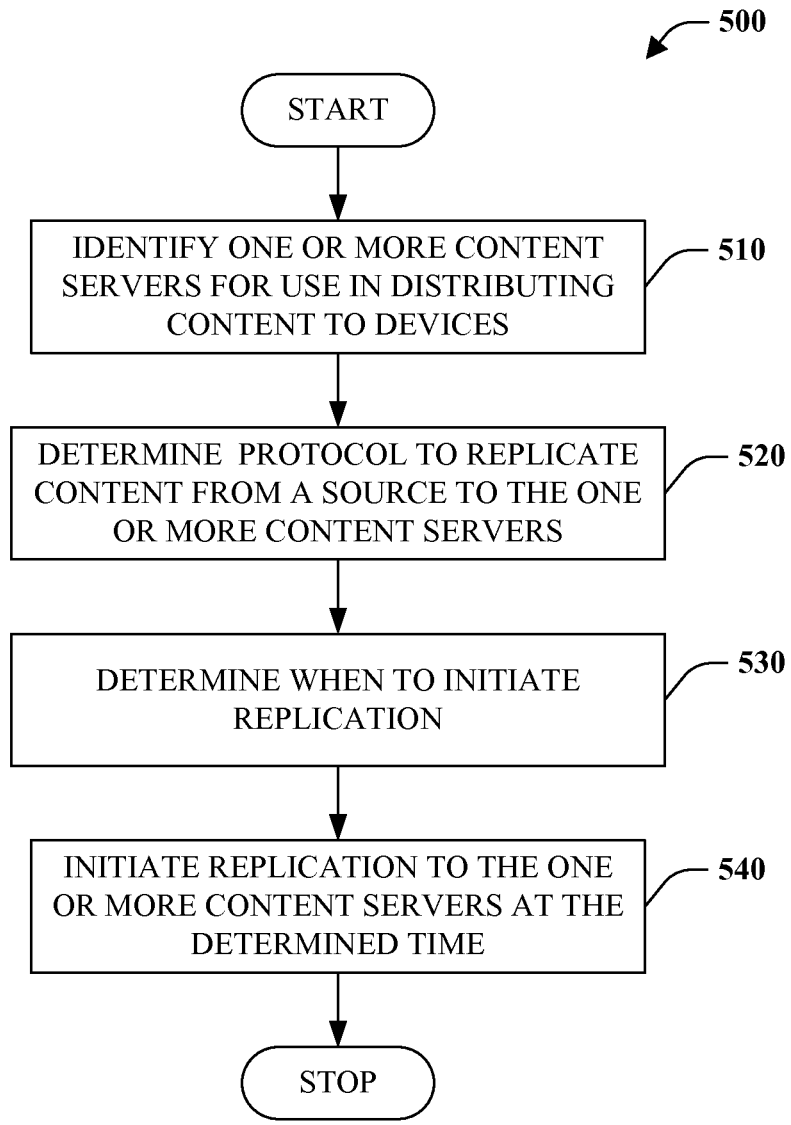
FIG. 5 is a flow chart diagram of a method of content replication.

Referring to FIG. 5, a content replication method 500 is illustrated. At reference numeral 510, the one or more content servers (a.k.a., distribution points, edge nodes, or staging servers) are identified automatically for use in distributing content to end-user devices. Selection can be based on a number of factors pertaining to at least content servers, devices, and content. More particularly, factors can include, but are not limited to, available content servers, content server configuration (e.g., hardware, software), content server location, distance available content servers, content server configuration (e.g., hardware, software), content server location, distances related to the content server (e.g., to/from content source, devices, or other content sources), content (e.g. size, execution environment . . . ), and targeted devices. In other words, at 510 a determination is made regarding where content should be replicated with respect to content servers.

At numeral 520, a content replication protocol is determined automatically for use in replicating data from one or more content sources to one or more identified content servers. This determination can also be based on a number of factors including but not limited to support for certain protocols by content servers, number of content servers targeted, location of content servers, and the speed and reliability of a communication link between a content source and target content server. Example protocols can be push, pull, broadcast, and multicast, which generally describe interaction between source and destination. For instance, push protocol is an interaction in which the source sends, or pushes, content to the destination, and pull protocol is a protocol in which the destination acquires, or pulls, the content from the source. Broadcast is similar to push except content can be provisioned in a session that allows substantially all destinations to acquire the content. Multicast is similar to broadcast but where the destinations are limited. In a scenario where there is a single content server targeted, it can be determined that push protocol is appropriate where the communication link between the source and target is reliable and fast, and pull protocol can preferred in the same scenario but where the communication is unreliable or slow, so as to avoid. Further, determining the protocol can comprise an order of replication amongst a plurality of content servers, for example, where some target content severs receive replicated data from a source and subsequently operate a content source for other content servers.

At numeral 530, a determination is made automatically as to when content replication should be initiated based a plurality of different factors. Some factors include whether content is required or optional, a specified deadline, past performance, and a roaming pattern associated with on more devices. By way of example, a particular date and time can be selected based on a specified deadline, the distance of a source and a content server, and the distance of between a content server and target devices. Further, adjustments can be made to compensate for additional time required to reach roaming devices and potentially poor past performance. Further yet, initiation can be performed in stages or steps to effect a particular determined protocol.

Finally, at reference number 540, content replication can be initiated at a determined time. More specifically, content can be replicated to one or more identified content servers employing the determined protocol associated with the one or more content servers. It is also to be appreciated the method of content replication can be semi-automatic. For example, rather that initiating replication, information can be provided to an IT administrator for example, who can then initiate replication or make changes to the targeted servers, protocol, or time determined.

Figure 6:
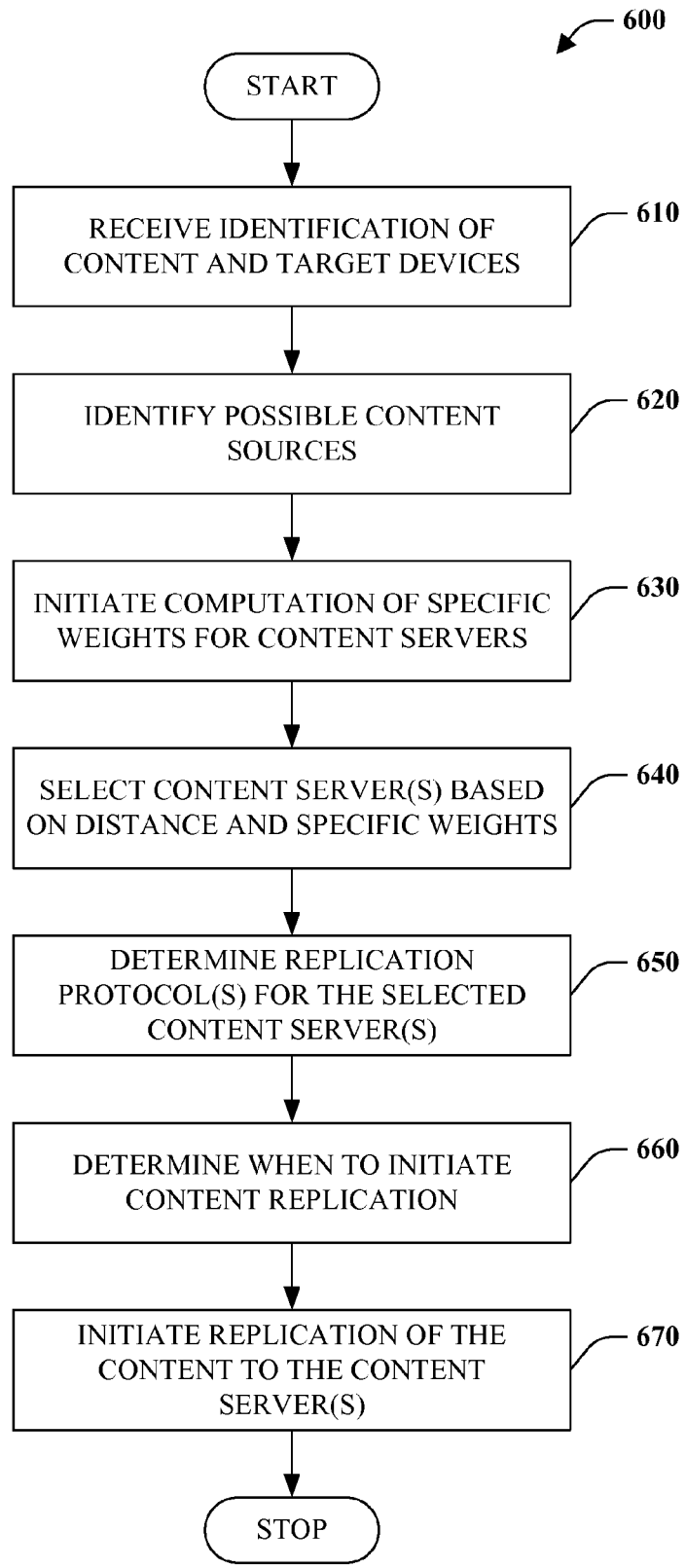
FIG. 6 is a flow chart diagram of a method of content replication.

FIG. 6 depicts a method 600 of content replication. At reference numeral 610, identification of content and target devices are received, retrieved, or otherwise obtained or acquired. For instance, an IT administrator can specify the content and target devices received at 610. At 620, one or more possible content sources are identified. At numeral 630, computation of specific weights for content servers is initiated. The specific weights capture relevant information specific to content and targeted devices for content servers as values that can be compared to facilitate a decision making process. At numeral 640, one or more content servers are selected based on specific weights and one or more content-server-related distances such as the distance between a content server and a source and the distance between a content server and target devices. At reference numeral 650, a replication protocol is determined based on factors such as the number of selected content servers, the location of the content servers and the quality of a communication link (e.g., reliability, bandwidth, speed . . . ) between selected content servers and one or more content sources. A determination is then made at 660, as to when content replication should be initiated. Factors considered here in include a specified deadline, past performance history, and the roaming pattern for one or more target devices, among other things. At reference numeral 670, content replication is initiated at the time determined More specifically, content is replicated to one or more selected content servers using the determined protocol with respect to the one or more content servers at the determined time.

Figure 7:
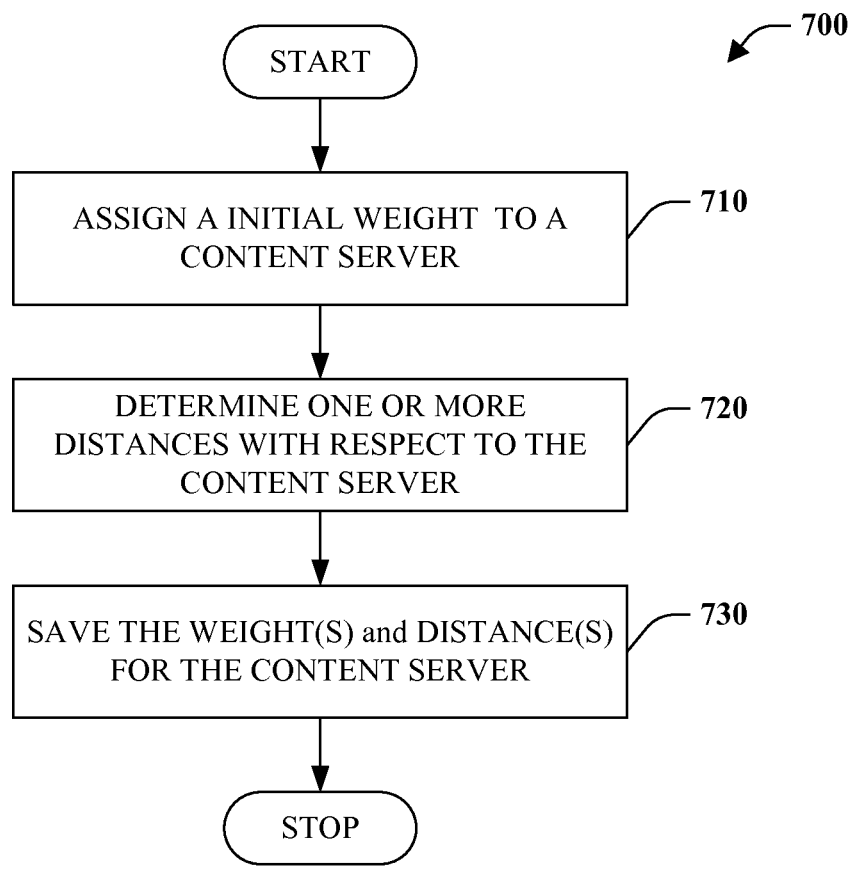
FIG. 7 is a flow chart diagram of relevant data collection.

FIG. 7 is a flow chart diagram of a method 700 of relevant data collection. At reference numeral 710, an initial weight can be determined and assigned to a content server. The initial weight can be a standard, non-specific weight that captures, among other things, the capabilities, or configuration, of a content server such as, but not limited to, the processor, memory, and storage capacity. Furthermore, the type of a content server can be considered, such as on premise, in the cloud, or at a third-party location. At numeral 720, one or more distances are determined with respect to the content server. For example, distances can be determined between potential content sources including other content servers and distances between content servers and devices. In one instance, distance can be computed based on the number of network hops on a path from a source to a destination, wherein hops are number of intermediate computer devices (e.g., routers, gateways . . . ) that are passed through. The weights and distances associated with a content server are saved at 730 for subsequent use.

Figure 8:
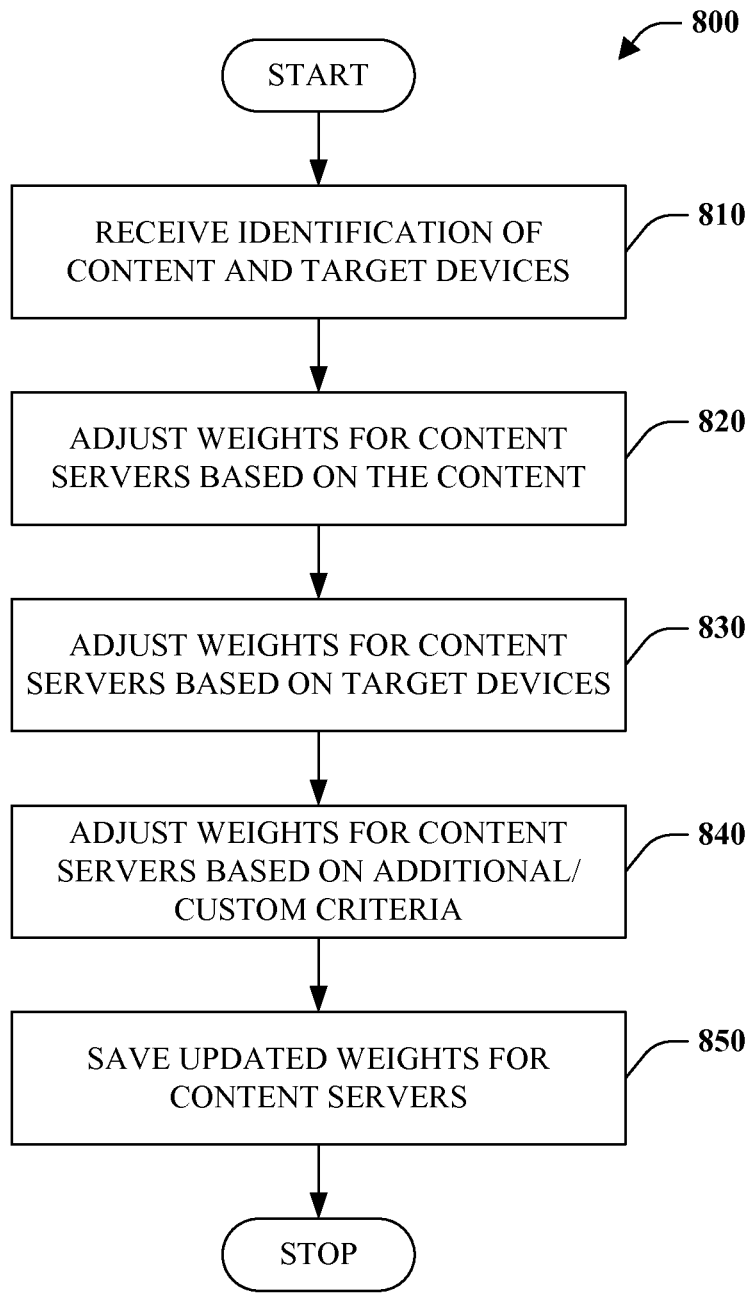
FIG. 8 is a flow chart diagram of a method of specific weight computation.

FIG. 8 depicts a method of specific weight computation 800. At numeral 810, identification of content and target devices is received, retrieved or otherwise obtained or acquired, for example from an IT administrator or other individual or entity. At numeral 820, initial weights for content servers are adjusted based on the content or a new weight is produced based on the initial weight and the content. For example, weights can be adjusted favorably for content servers that have storage capacity capable of storing the content. At numeral 830, weights for content servers can be adjusted based on target devices. For instance, weights can be adjusted favorably for content servers that are located closer to target devices as opposed to farther away and based on the number of target devices reachable by a content server. Accordingly, a first content server can be weighted more favorably than a second content server, if the first content server can reach more of the target devices than the second content server, with all else being equal. At reference numeral 840, any additional or custom criteria can be considered and content server weights adjusted accordingly. For instance, customers (e.g., businesses, organizations or other entities that deploy the system for a purpose) can define additional constraints or customizations according to their needs. Additionally, an IT administrator or other person or entity can inject knowledge into the system by way of rules or constraints. For example, a particular content server may be off limits for data replication for various reasons, and that fact can be reflected in the weight associated with the content server. At numeral 850, the specific weights for content servers can be saved. These specific weights capture particular concerns related to content and target devices, among other things.

Figure 9:
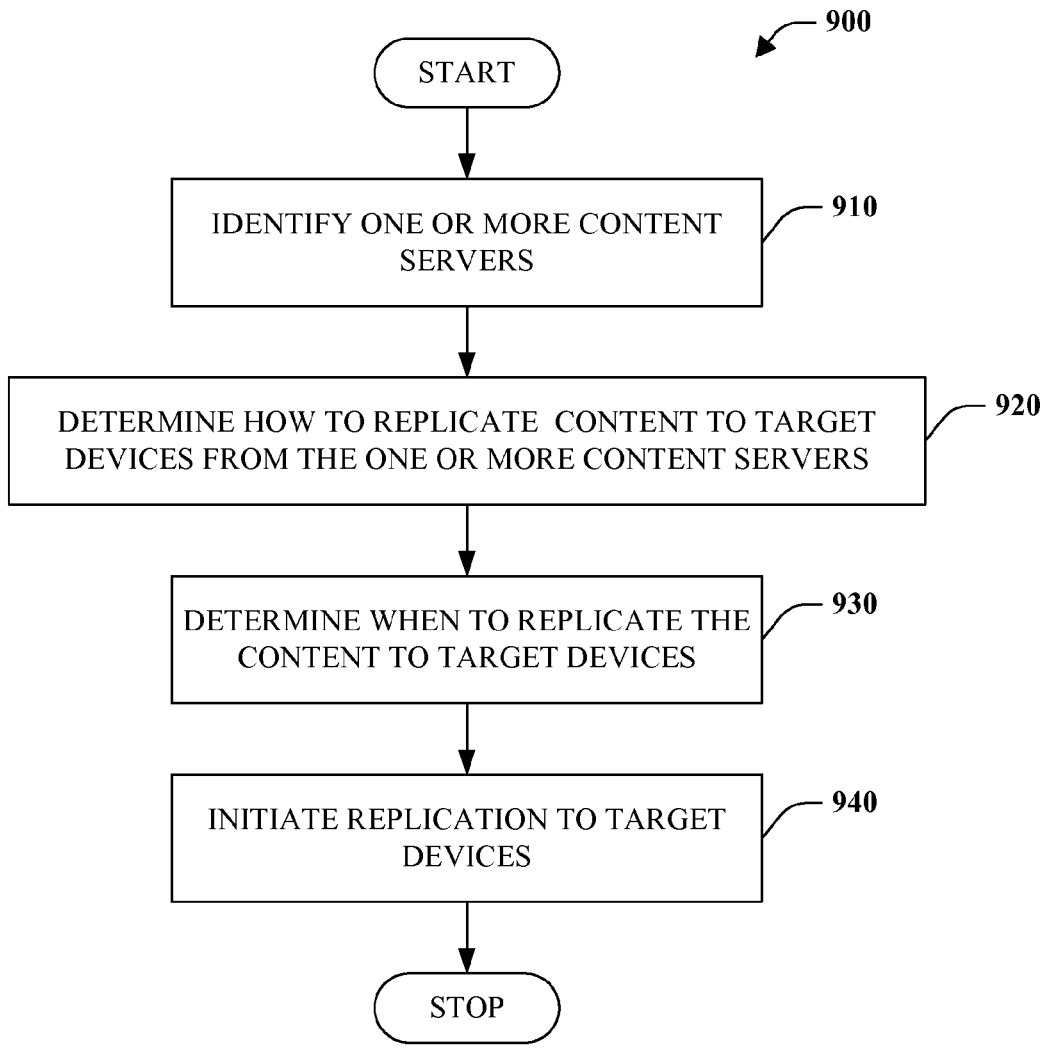
FIG. 9 is a flow chart diagram of a method of distributing content to target devices.

FIG. 9 is a flow chart diagram of a method 900 of distributing content to target devices. At reference numeral 910, one or more content servers are identified. Identified content servers include content to be distributed. At numeral 920, a determination is made as to how to distribute or replicate content to previously identified target devices from the one or more identified content servers automatically. The determination can take several factors into account including the number of target devices, supported protocol (e.g., push, pull, broadcast . . . ), distance between target devices and content servers, and communication link quality, among other things. At numeral 930, a determination is made as to when to replicate the content automatically. Again, numerous factors can be considered including, among others, a deadline, past performance, content priority, and roaming pattern of one or more target devices. At numeral 940, content is replicated or distributed to target devices utilizing an automatically determined protocol and at an automatically determined time.

Figure 10:
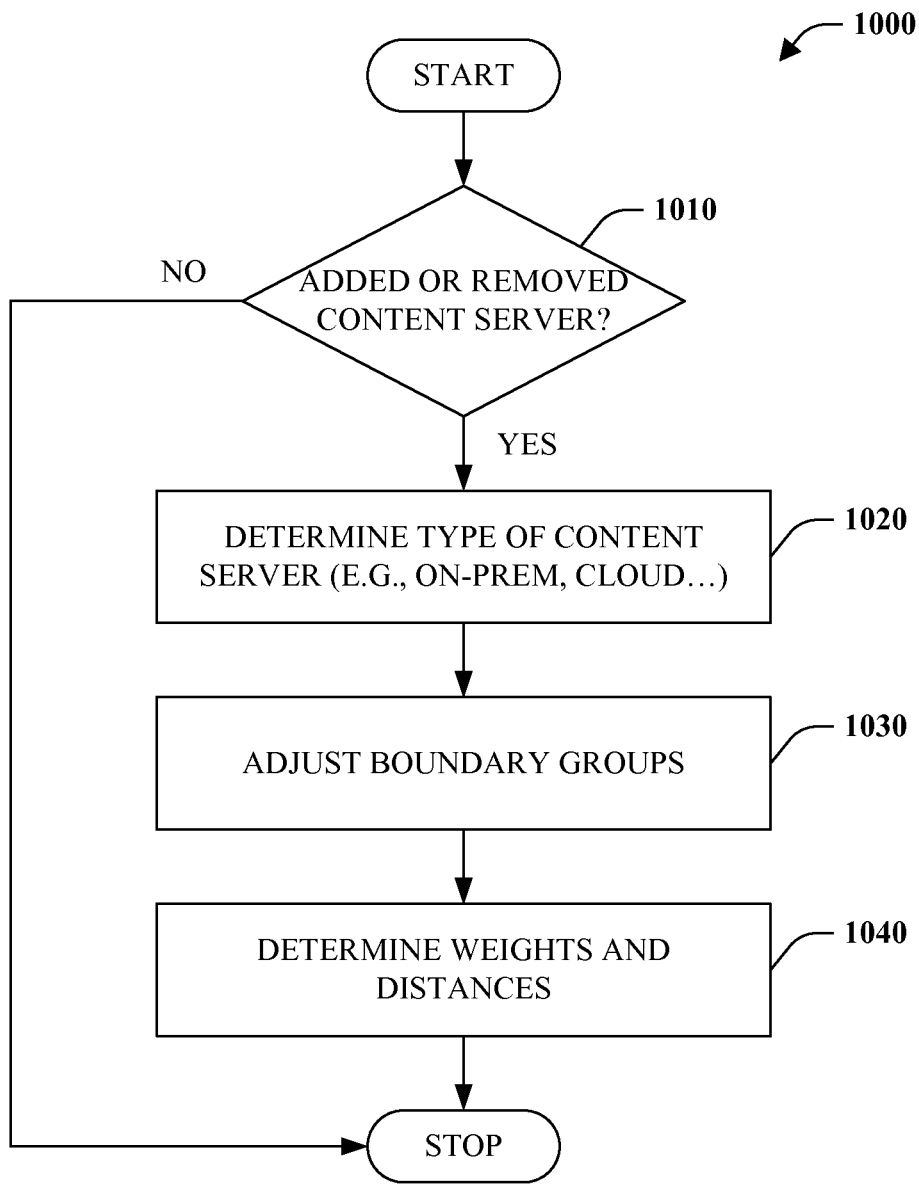
FIG. 10 is a flow chart diagram of a change response method.

FIG. 10 illustrates a method 1000 of change response. At reference numeral 1010, a determination is made as to whether a content server has been added or removed. If at numeral 1010 a content server has not been added or removed ("NO"), the method terminates. Alternatively, if a content server has been added or removed ("YES"), the method continues at numeral 1020, where the type of the content server is determined. For example, the content server could be on premise, in the cloud, or at a third-party location. The type of content server is typically decided by an organization. Any time a new content is added or removed boundary groups are adjusted, at 1030. For example, a new boundary group can be created, where in a boundary group is a virtual demarcation specifying groups of devices and content servers that are close in proximity. Accordingly, a group can be created based on the proximity of devices with respect to a new content server. At reference numeral 1040, weights and distances can be computed. For a new content server, an initial weight can be determined based on factors such as the type of content server, storage capacity, network speed to the content server, and outgoing network traffic, among other things. The weight can simply be a number like fifty or one hundred to facilitate comparison of content servers. Additionally, distances can be determined with respect to a content server such as the distance between a content server and devices or other content servers.

Figure 11:
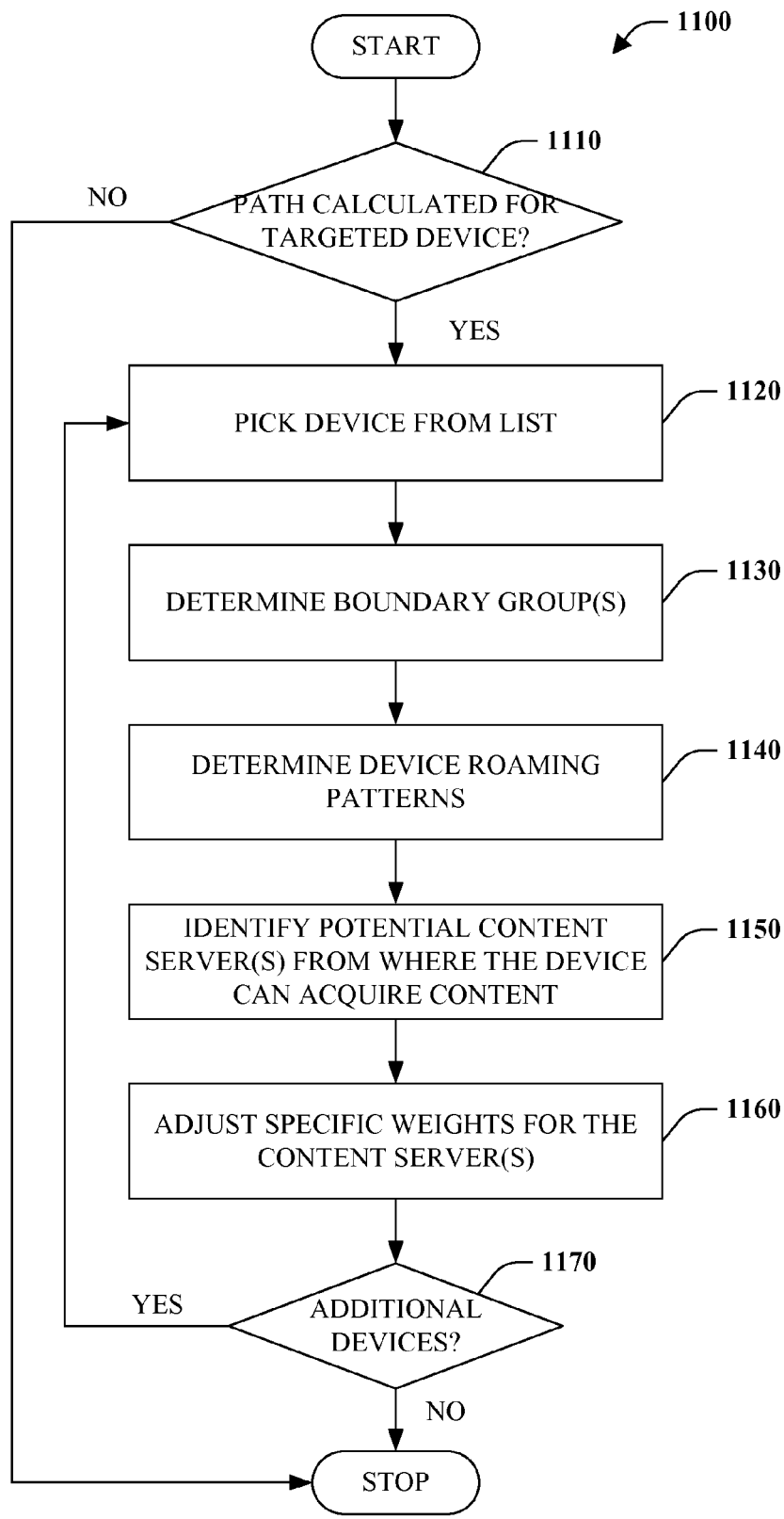
FIG. 11 is a flow chart diagram of a method determining specific weight for content servers.

FIG. 11 depicts a method 1100 of determining specific weights for content servers. At reference numeral 1110, a determination is made as to whether, or not, there are any content target devices whose path of content distribution has not been calculated. In other words, the determination pertains to whether or not, a path has been determined from a device to one or more content servers. This can be the case when a new device is added to the system. More specifically, the path includes network hops or the like from a master source to target device. In the simplest case, the master source is the content server that directly servers a device (1 hop). In slightly more complicated case, the master source serves content to the content server, which serves the content to a device (2 hops). In more complicated cases, however, there can be additional server content servers in between, each serving down a "tree" to each other, before the target device is finally reached. For example, multiple content servers can pull content from other pull content servers, which could pull from other content servers, and so forth generating a deep tree.

If target devices have previously had their path calculated ("NO"), the method terminates. If at least one of the target devices does not have its path calculated ("YES"), the method continues at numeral 1120, where a first target is selected from a list of target devices. At numeral 1130, one or more boundary groups are determined with for the device. This can be determined by locating one or more content server within a particular proximity of the device. At reference 1140, a device-roaming pattern can be determined, if possible, by analyzing past history and identifying content servers within a predetermined proximity of the device. At numeral 1150, one or more content servers from which a device can acquire content are identified based on a boundary group and a roaming pattern of the device, for example. At reference 1160, specific weight for the one or more identified content servers is adjusted favorably since the content servers can reach devices targeted for content. Note that the number of target devices that can acquire content from a particular content server as well as how long it takes content to reach a device can be significant factors with respect to specific weight. A determination is made at numeral 1170 as to whether or not additional target devices are have not yet have a path determined. If there are additional devices ("YES"), the method proceeds to 1120 where the next device is selected in the list. Otherwise ("NO"), the method terminates.

Figure 12:
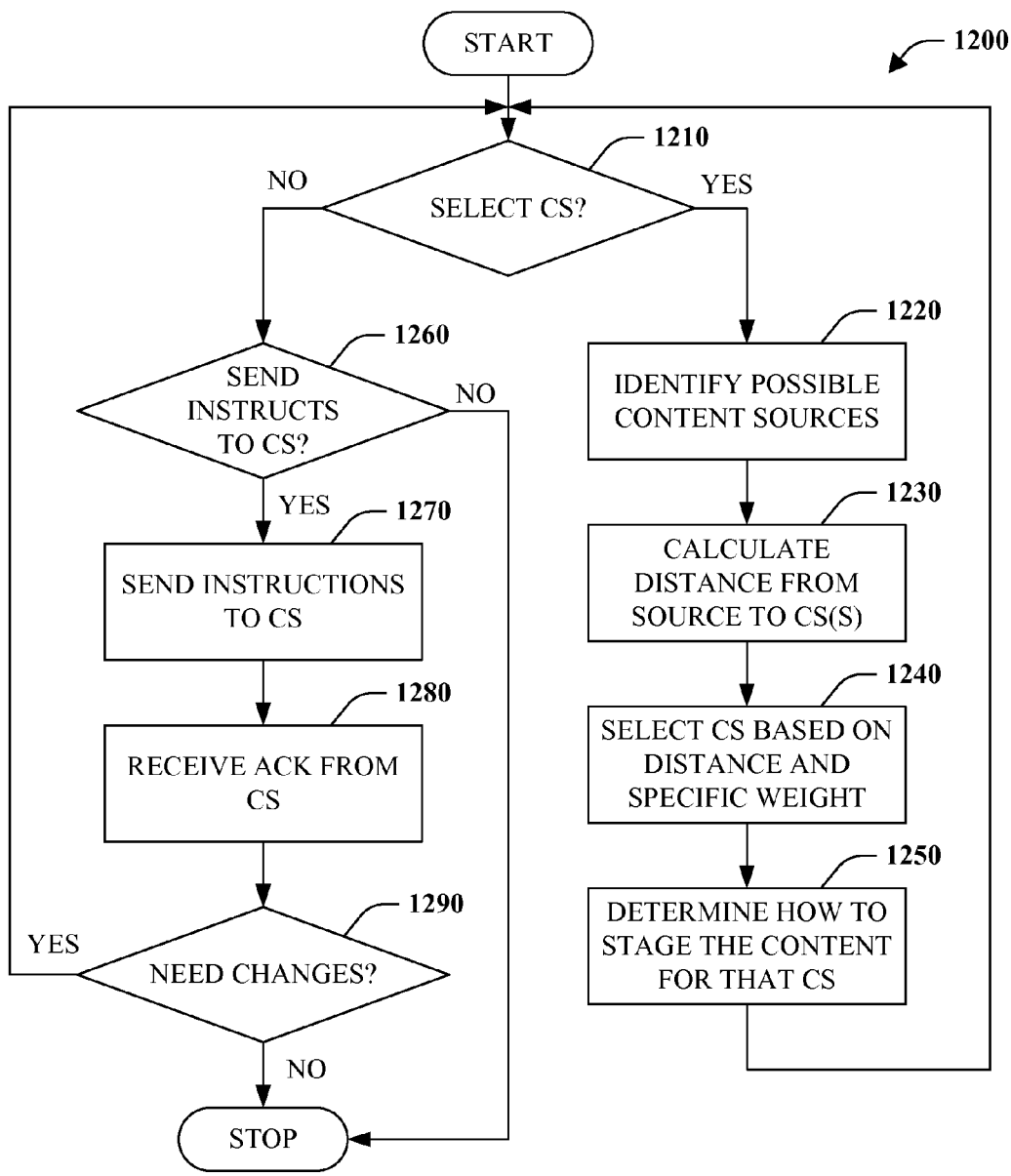
FIG. 12 is a flow chart diagram of method of content replication.

FIG. 12 depicts a flow chart diagram of a method 1200 of content replication. At reference numeral 1210, a determination is made concerning whether or not to select a content server to which content can be distributed. If yes, the method continues at 1220 where possible content sources are identified. Distances between possible content sources and available content sources are calculated at 1230. Next, at 1240, a content server is selected based on distances and specific weights for content servers. For example, a content server can be selected that is proximate to a content source and target devices. At reference numeral 1250, a protocol is determined for how to stage or deliver content to the selected content server. For example, one of a push, pull, or broadcast protocol can be selected based on what protocols are supported by the content server, the number of target devices, location of target devices relative to each other, and the quality of the communication link between a source and the content server, among other factors. After a content server is selected and protocol determined, the method can continue at 1260, where a determination is made as to whether or not to send instructions to the content server. If it is determined that instructions are not to be sent ("NO"), the method simply terminates. If it is determined that instructions are to be sent ("YES"), for example to notify content servers that content is available for acquisition from a source at a particular location or when and where the content will be broadcast, the method continues at 1270, where instructions are sent to the content server. An acknowledgement can be received from a content server at 1280 and the method continues to numeral 1290. If at numeral 1290 it is determined based on the acknowledge message that changes are not needed ("NO"), the method terminates. Alternatively, if at numeral 1290 it is determined based on the acknowledgement that changes are needed ("YES"), the method proceeds to 1290 where another content server, content source pair can be determined Changes may be needed if the content server indicates through the acknowledgement that it cannot reach the source or the network connection is down, among other reasons. Furthermore, in accordance with one implementation multiple sources can be identified with respect to a content server, such as a primary source and secondary source, to provide a fallback source should content not be available to a content server from a source.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner It is to be appreciated a myriad of additional or alternate examples of varying scope could have been presented, but have been omitted for purposes of brevity.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A' employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 13:
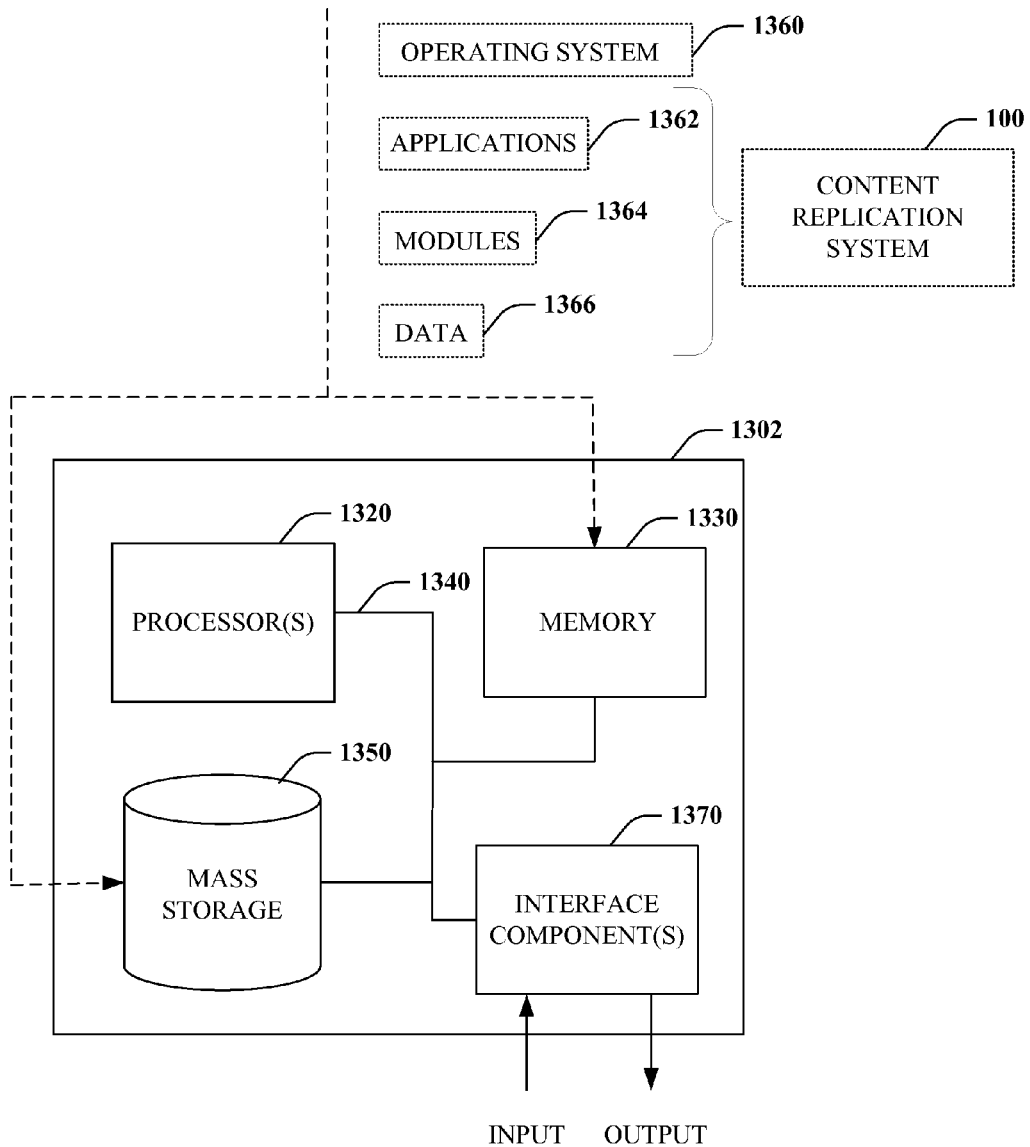
FIG. 13 is a schematic block diagram illustrating a suitable operating environment for aspects of the subject disclosure.

In order to provide a context for the claimed subject matter, FIG. 13 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 13, illustrated is an example general-purpose computer or computing device 1302 (e.g., desktop, laptop, tablet, server, hand-held, programmable consumer or industrial electronics, set-top box, game system, compute node . . . ). The computer 1302 includes one or more processor(s) 1320, memory 1330, system bus 1340, mass storage 1350, and one or more interface components 1370. The system bus 1340 communicatively couples at least the above system components. However, it is to be appreciated that in its simplest form the computer 1302 can include one or more processors 1320 coupled to memory 1330 that execute various computer executable actions, instructions, and or components stored in memory 1330.

The processor(s) 1320 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1320 may also be implemented as a combination of computing devices, for example a combination of a DSP and a microprocessor, a plurality of microprocessors, multi-core processors, one or more microprocessors in conjunction with a DSP core, or any other such configuration.

The computer 1302 can include or otherwise interact with a variety of computer-readable media to facilitate control of the computer 1302 to implement one or more aspects of the claimed subject matter. The computer-readable media can be any available media that can be accessed by the computer 1302 and includes volatile and nonvolatile media, and removable and non-removable media. Computer-readable media can comprise computer storage media and communication media.

Computer storage media includes volatile and nonvolatile, removable and non-removable media implemented in any method or technology for storage of information such as computer-readable instructions, data structures, program modules, or other data. Computer storage media includes memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that can be used to store, as opposed to transmit, the desired information accessible by the computer 1302. Accordingly, computer storage media excludes modulated data signals.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1330 and mass storage 1350 are examples of computer-readable storage media. Depending on the exact configuration and type of computing device, memory 1330 may be volatile (e.g., RAM), non-volatile (e.g., ROM, flash memory . . . ) or some combination of the two. By way of example, the basic input/output system (BIOS), including basic routines to transfer information between elements within the computer 1302, such as during start-up, can be stored in nonvolatile memory, while volatile memory can act as external cache memory to facilitate processing by the processor(s) 1320, among other things.

Mass storage 1350 includes removable/non-removable, volatile/non-volatile computer storage media for storage of large amounts of data relative to the memory 1330. For example, mass storage 1350 includes, but is not limited to, one or more devices such as a magnetic or optical disk drive, floppy disk drive, flash memory, solid-state drive, or memory stick.

Memory 1330 and mass storage 1350 can include, or have stored therein, operating system 1360, one or more applications 1362, one or more program modules 1364, and data 1366. The operating system 1360 acts to control and allocate resources of the computer 1302. Applications 1362 include one or both of system and application software and can exploit management of resources by the operating system 1360 through program modules 1364 and data 1366 stored in memory 1330 and/or mass storage 1350 to perform one or more actions. Accordingly, applications 1362 can turn a general-purpose computer 1302 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, content replication system 100, or portions thereof, can be, or form part, of an application 1362, and include one or more modules 1364 and data 1366 stored in memory and/or mass storage 1350 whose functionality can be realized when executed by one or more processor(s) 1320.

In accordance with one particular embodiment, the processor(s) 1320 can correspond to a system on a chip (SOC) or like architecture including, or in other words integrating, both hardware and software on a single integrated circuit substrate. Here, the processor(s) 1320 can include one or more processors as well as memory at least similar to processor(s) 1320 and memory 1330, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the content replication system 100 and/or associated functionality can be embedded within hardware in a SOC architecture.

The computer 1302 also includes one or more interface components 1370 that are communicatively coupled to the system bus 1340 and facilitate interaction with the computer 1302. By way of example, the interface component 1370 can be a port (e.g., serial, parallel, PCMCIA, USB, FireWire . . . ) or an interface card (e.g., sound, video . . . ) or the like. In one example implementation, the interface component 1370 can be embodied as a user input/output interface to enable a user to enter commands and information into the computer 1302, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 1370 can be embodied as an output peripheral interface to supply output to displays (e.g., LCD, LED, plasma . . . ), speakers, printers, and/or other computers, among other things. Still further yet, the interface component 1370 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method performed by a system comprising at least one processor coupled to a memory storing machine-executable instructions, which, when executed, control the system to perform acts comprising:
   receiving identification of content and a set of target devices prior to distribution of the content to the set of target devices;
   selecting one or more content servers for content replication automatically, from one or more available content servers, in response to the identification of the content and the set of target devices, based on at least one boundary group, wherein a boundary group comprises one or more devices and zero or more content servers within a predetermined distance; and
   initiating automatic replication of the content to the one or more selected content servers.

2. The method of claim 1 further comprises selecting the one or more content servers based on one or more of distance between a content source and the one or more available content servers.

3. The method of claim 1 further comprises selecting the one or more content servers based on a roaming pattern of at least one device in the set of target devices.

4. The method of claim 1 further comprises selecting the one or more content servers based on one or more user specified constraints.

5. The method of claim 1 further comprises automatically determining a protocol to replicate content from a source to the one or more content servers selected.

6. The method of claim 5 further comprises determining the protocol based on at least one of number of content servers selected, location of the content servers, or quality of a communication link between a content source and the one or more content servers.

7. The method of claim 5 further comprises initiating replication of the content to the one or more content servers with the protocol determined for the one or more content servers automatically.

8. The method of claim 7 further comprises determining when to initiate replication of the content based on one or more of a deadline or content priority.

9. The method of claim 1 further comprises automatically determining a protocol and time to distribute the content from the one or more content servers to the set of target devices.

10. A system, comprising:
   a processor coupled to a memory, the processor configured to execute computer-executable components instructions stored in the memory that when executed perform acts comprising:
   analyzing content distribution system resources including boundary group identification in response to receipt of content and a set of target devices for the content specified by a user, wherein a boundary group comprises one or more devices and zero or more content servers within a predetermined distance; and
   identifying one or more content servers to target automatically for duplicate content to enable efficient distribution of content to a set of target devices based on the boundary group identification, wherein a content server is identified for at least a subset of the set of target devices in a boundary group of the subset of the set of target devices group, wherein the content server in the boundary group is identified from multiple content servers based on content server configuration and availability.

11. The system of claim 10 further comprises identifying one or more protocols for content replication for the one or more content servers identified automatically based on at least one of number of the one or more content servers identified, location of the one or more content servers relative to each other, or quality of a communication link between a content source and the one or more content servers.

12. The system of claim 11 further comprises initiating replication of content with the one or more protocols on the one or more content servers identified based on at least one of a deadline or roaming pattern of one or more target devices of the set of target devices.

13. The system of claim 10, further comprises assigning, to available content servers, at least one of an initial weight based on content server configuration.

14. The system of claim 10 further comprises assigning, to available content servers, a specific weight based on the content to be distributed and the set of target devices.

15. A computer-readable storage medium having instructions stored thereon that enable at least one processor to perform a content replication method upon execution of the instructions, the method comprising:
   receiving identification of content and a set of target devices, specified by a user, prior to distribution of the content to the set of target devices;
   identifying one or more content servers for replicated content automatically, in response to identification of the content and the set of target devices, based on at least one boundary group, wherein a boundary group comprises one or more devices and zero or more content servers within a predetermined distance
   determining a protocol to replicate the content from one or more content sources to the one or more content servers, wherein the protocol is one of pull, push, broadcast or multicast;
   determining when to initiate content replication to the one or more content servers in accordance with the protocol; and
   initiating content replication from one or more content sources to the one or more content servers at a determined time.

16. The computer-readable storage medium of claim 15, the method further comprises determining the protocol automatically based on at least one of number of the one or more content servers identified, location of the one or more content servers identified, or quality of a communication link between the content source and the one or more content servers.

17. The computer-readable storage medium of claim 15, the method further comprises determining when to initiate content replication automatically based on at least one of a deadline or content priority.

18. The computer-readable storage medium of claim 15, the method further comprises:
   determining a protocol to distribute the content on the one or more content servers to the set of target devices;
   determining when to initiation distribution of the content to the set of target devices; and
   initiating the distribution of the content at a determined time to the set of target devices.

* * * * *